US012436982B2

(12) United States Patent
Kotaru

(10) Patent No.: US 12,436,982 B2
(45) Date of Patent: Oct. 7, 2025

(54) DATA INTELLIGENCE MODEL FOR OPERATOR DATA QUERIES

(71) Applicant: Microsoft Technology Licensing, LLC, Redmond, WA (US)

(72) Inventor: Manikanta Kotaru, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 137 days.

(21) Appl. No.: 18/209,315

(22) Filed: Jun. 13, 2023

(65) Prior Publication Data

US 2024/0419705 A1 Dec. 19, 2024

(51) Int. Cl.
| | |
|---|---|
| *G06F 16/334* | (2025.01) |
| *G06F 16/242* | (2019.01) |
| *G06F 16/31* | (2019.01) |
| *G06F 16/3329* | (2025.01) |
| *G06F 16/338* | (2019.01) |
| *G06F 40/30* | (2020.01) |
| *G06N 3/045* | (2023.01) |

(52) U.S. Cl.
CPC ........ *G06F 16/3344* (2019.01); *G06F 16/313* (2019.01); *G06F 16/3329* (2019.01); *G06F 16/338* (2019.01)

(58) Field of Classification Search
CPC ............... G06F 16/3344; G06F 16/313; G06F 16/3329; G06F 16/338; G06F 16/243; G06F 40/30; G06N 3/045
See application file for complete search history.

(56) References Cited

U.S. PATENT DOCUMENTS

| | | | |
|---|---|---|---|
| 11,726,994 B1 * | 8/2023 | Wang | G06F 16/24573 707/769 |
| 2018/0210883 A1 * | 7/2018 | Ang | G06F 40/284 |

(Continued)

FOREIGN PATENT DOCUMENTS

WO WO-2024229375 A1 * 11/2024

OTHER PUBLICATIONS

Dai, et al., "Promptagator: Few-shot Dense Retrieval From 8 Examples", arXiv:2209.11755v1, Sep. 23, 2022, 21 pages.

(Continued)

*Primary Examiner* — Dennis Truong

(57) ABSTRACT

Operators managing a cloud RAN collect vast amounts of data, e.g., node-level data, gNodeB level data, user level data, and flow-level data, which are utilized for network monitoring, evaluating key performance indicators (KPIs), and nodes management. Retrieving and visualizing information and values of different metrics is critical to managing network operation; however, data retrieval on large datasets is challenging. While foundation models perform poorly on large datasets, an accurate answer to a data query is generated by providing semantically similar metrics as context to a foundation model, thereby limiting the number of counters needed for processing the data query. The foundation model then generates a first output of metrics relevant to answering the data query and, based on the first output, generates a second output comprising query code (e.g., SQL or KQL) for computing the answer, thereby improving mathematical accuracy of the answer.

20 Claims, 10 Drawing Sheets

(56) References Cited

U.S. PATENT DOCUMENTS

| | | | |
|---|---|---|---|
| 2020/0210524 A1* | 7/2020 | Yang | G06F 40/30 |
| 2020/0210525 A1* | 7/2020 | Yang | G06F 40/30 |
| 2020/0301925 A1* | 9/2020 | Zhong | G06N 3/045 |
| 2021/0117417 A1* | 4/2021 | Hendrickson | G06F 16/90 |
| 2021/0271983 A1* | 9/2021 | Mohanty | G06F 16/2425 |
| 2021/0374133 A1* | 12/2021 | Lin | G06F 16/24522 |
| 2022/0067037 A1* | 3/2022 | Ranganathan | G10L 15/22 |
| 2023/0259787 A1* | 8/2023 | David | G06N 3/0455 |
| | | | 706/15 |
| 2023/0289698 A1* | 9/2023 | Bly | G06Q 10/06393 |
| 2024/0248896 A1* | 7/2024 | Boskovic | G06F 16/24522 |
| 2024/0303235 A1* | 9/2024 | Kulkarni | G06F 16/24522 |
| 2024/0362212 A1* | 10/2024 | Sun | G06F 16/24522 |
| 2024/0362409 A1* | 10/2024 | Kuan | G06F 40/30 |

OTHER PUBLICATIONS

Guo, et al., "A Case-Based Reasoning Framework for Adaptive Prompting in Cross-Domain Text-to-SQL", arXiv:2304.13301v1, Apr. 26, 2023, 16 pages.

International Search Report and Written Opinion received for PCT Application No. PCT/US2024/032174, (MS# 413223-PCT01) mailed on Oct. 10, 2024, 13 pages.

Trummer, Immanuel, "CodexDB: Generating Code for Processing SQL Queries using GPT-3 Codex", arXiv:2204.08941v1, Apr. 19, 2022, 7 pages.

* cited by examiner

Metric 202A
  Name 204A
    amfcc_nsmf_pdusession_retrieve_sm_context_request
  Type 206A
    64-bit Counter
  Description 208A
    The number of retrieve SM context requests sent by AMF. The request message body carries SMContextRetrieveData structure as defined in section 6.1.6.2.7 of 3GPP TS 29.502.
  Label(s) 210A
    *dnn, slice, peer*

Metric 202B
  Name 204B
    amfcc_nsmf_pdusession_retrieve_sm_context_response
  Type 206B
    64-bit Counter
  Description 208B
    The number of retrieve SM context responses received by AMF. On success, request message body contains SMContextRetrieveData structure as defined in section 6.1.6.2.27 of 3GPP TS 20.502. On failure, response message body contains ProblemDetails structure as defined in section 5.2.4.1 of 3GPP TS 29.571.
  Label(s) 210B
    *dnn, slice, peer, result*

200A

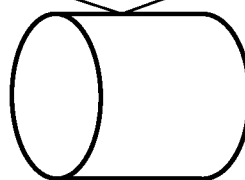

Metric Definitions Database 201

FIG. 2A

DATA INTELLIGENCE MODEL FOR OPERATOR DATA QUERIES

BACKGROUND

With the advent of 5G, Multi-access Edge Computing (MEC) has become important to improve performance of cloud services. In MEC, a hierarchy of devices, datacenters and servers is used to provide cloud computing capabilities and information technologies at the edge of a radio access network (RAN), such as 5G. Since MEC runs applications and provides processing in proximity to the cellular client (including mobile or other user devices, Internet-of-Things (IoT) devices, etc.), network congestion and associated latencies can be reduced. However, to manage such a system, operators collect vast amounts of data, e.g., node-level data, gNodeB level data, user level data, and flow-level data, which are utilized for network monitoring, evaluating key performance indicators (KPIs), and nodes management. In examples, the data is also used for customer billing, policy monitoring and enforcement, consumption trends analysis for different types of traffic, and debugging. The number of counters and metrics regularly computed runs into thousands for a commercial operator network, with more than 6,000 metrics and counters being collected, accounting for tens of Gbps of data transfer. Retrieving and visualizing information and values of different metrics is critical for network operation and will only increase in importance with the rise of private networks and corresponding standards (e.g., 3GPP). However, the complexity of modern wireless communication networks and the vast number of collected metrics and associated data create a significant challenge in obtaining relevant and timely information.

It is with respect to these and other general considerations that embodiments have been described. Also, although relatively specific problems have been discussed, it should be understood that the embodiments should not be limited to solving the specific problems identified in the background.

SUMMARY

Aspects of the present application relate to providing mathematically accurate answers to data retrieval, visualization and analytics queries on 5G operator data, which may be implemented using one or more multimodal ML models. For example, the present application provides a natural way to interact with vast amounts of data without heavy dependence on specialists. As will be described more thoroughly below, foundation models perform poorly on large datasets, particularly those including specialized information, and often are unable to output mathematically accurate answers to data queries. The present application overcomes such challenges by providing semantically similar metrics as context to a foundation model, thereby limiting the number of metrics needed for processing a data query. The foundation model then generates a first output of metrics relevant to answering the data query and, based on the first output, generates a second output comprising query code (e.g., SQL or KQL) for computing the answer based on the relevant metrics, thereby improving a mathematical accuracy of the answer.

As noted above, in Multi-access Edge Computing (MEC), a hierarchy of devices, datacenters and servers with varying levels of resource availability and geographic locality is used to provide cloud computing capabilities and information technologies at the edge of a radio access network (RAN), such as 5G. The term "on-premises edge" may refer to a server or datacenter at a remote location at the far-edge of a private cloud, which may be in proximity to one or more cell towers. The "network edge" may refer to distributed servers and datacenters implementing a core network at the near-edge of a private cloud. The RAN, in combination with a core network of a cloud service provider, represents a backbone network for mobile wireless telecommunications. For example, cell towers may receive and transmit radio signals to communicate with user devices (e.g., mobile phones) or IoT devices (e.g., video cameras) over a RAN (e.g., 5G), which may utilize cloud services for data analytics, information technologies, or other services. Various service applications implemented by MEC may perform different functions, such as network monitoring and management.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 2A illustrates an overview of example metric definitions associated with operator metric data collected for managing a cloud RAN according to aspects described herein.

DETAILED DESCRIPTION

Figure 1:
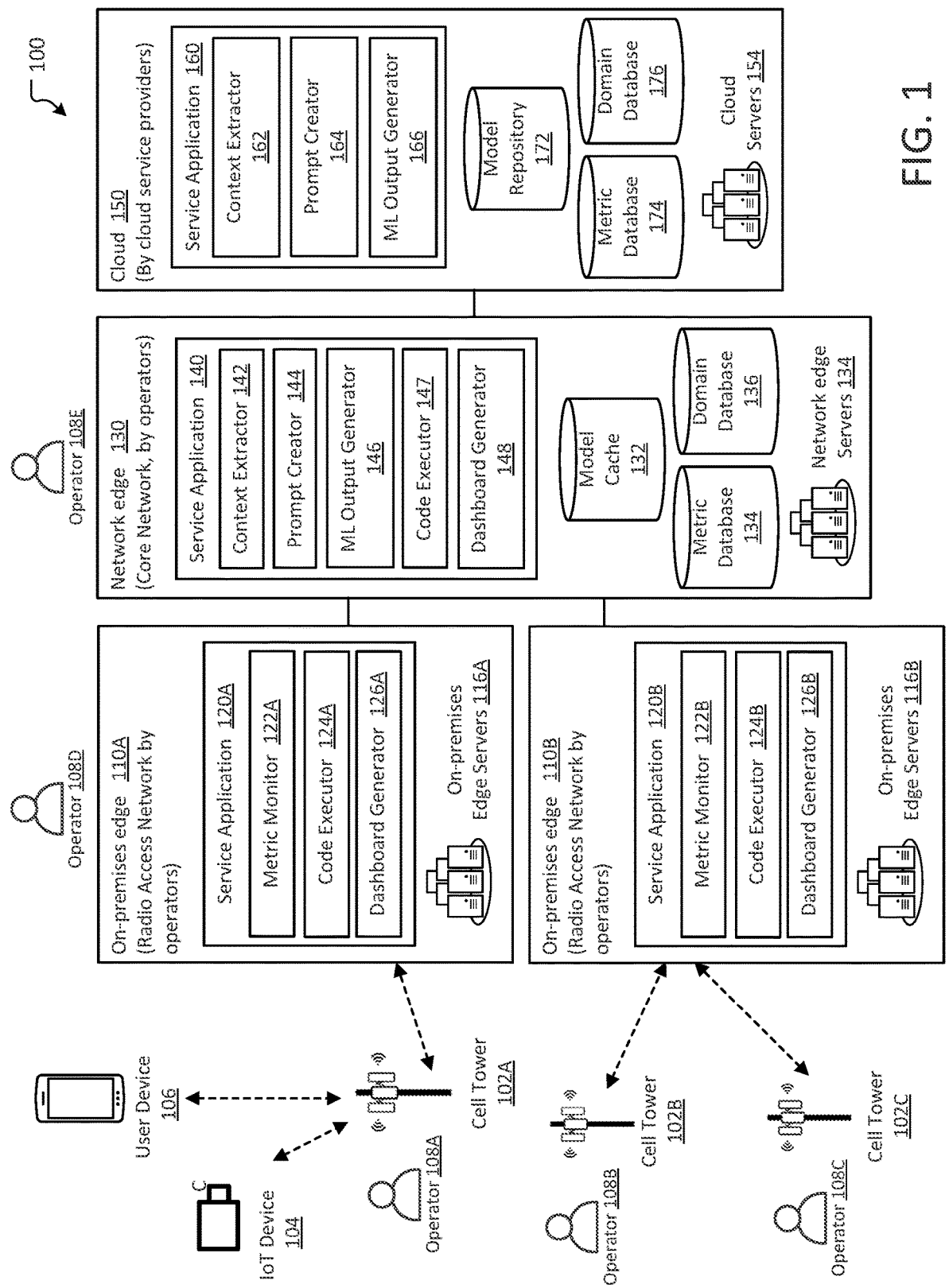
FIG. 1 illustrates an overview of an example system in which one or more machine learning (ML) models may be used to improve network management of a cloud RAN according to aspects of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As mentioned above, operators managing MEC systems collect vast amounts of data, e.g., node-level data, gNodeB level data, user level data, and flow-level data, which are utilized for network monitoring, evaluating key performance indicators (KPIs), and nodes management (e.g., monitoring capacity for network planning). In examples, the data is also used for customer billing, policy monitoring and enforcement, consumption trends analysis for different types of traffic, and debugging. The number of counters and metrics regularly computed runs into thousands for a commercial operator network, with more than 6,000 metrics and counters being collected, accounting for tens of Gbps of data transfer. In aspects, different groups of statistics are collected and each group contains hundreds of counters, with each counter having a complex name. For example, counter amfcc_nsmf_pdusession_create_sm_context_request records the number of create session management context requests sent by Access & Mobility Management Function (AMF), which is a control plane function in the 5G core network. Retrieving and visualizing information and values of different metrics is critical for network operation and will only increase in importance with the rise of private networks and corresponding standards (e.g., 3GPP). However, the complexity of modern wireless communication networks and the vast number of collected metrics and associated data create a significant challenge in obtaining relevant and timely information.

Currently, specialists with that expert knowledge create dashboards for different metrics, which dashboards operators must browse to obtain relevant information. For example, if an operator is interested in retrieving overall uplink throughput, they must browse through a series of dashboards to uncover the required overall uplink throughput. Compounding the issue, some operator queries are not represented by available dashboards. For example, an operator may want to obtain the throughput for a particular user or need access to different data for debugging purposes. Then a specialist, who is equipped with the knowledge of relevant variables, must write an SQL (Structured Query Language) or KQL (Kusto Query Language) query and share it as a dashboard. Further complicating the issue, continuously collecting the large number of metrics to populate these dashboards requires large data transfers from the Data Lakes storing the data to the cloud where the data analysis happens.

To overcome these and other issues, the present application provides a natural way to interact with vast amounts of data without heavy dependence on specialists. In this way, an operator can ask a simple question in natural language (e.g., NL query), without needing to remember counter names or how they should be combined in an SQL or KQL query, and receive a more accurate answer (or answers) as compared to an answer (or answers) generated directly by a foundation or generative ML model in response to the NL query. While foundation models make it possible to interact with data using natural language, these foundation models do not really scale well to the vast amounts and types of 5G operator data. For instance, if an operator asks a simple question regarding how many protocol data unit (PDU) sessions there are at a given time and provides sample operator data, foundation models do not produce a relevant answer or understand the fields associated with PDUs in production 5G cores. In aspects, it is challenging to apply a foundation model to operator data for at least three reasons:

Specialized information—The data counters and metric definitions for a cloud RAN are very specialized and may not even be publicly available. This causes a foundation model to miss the relevant text patterns and prevents it from understanding the fields very well.

Huge data—The number of counters and the amount of data collected and maintained for management of a cloud RAN is enormous. As discussed above, there are thousands of counters and tens of Gbps worth of data being continuously collected across a cloud RAN.

Mathematical accuracy—Although foundation models are very good at reasoning, they are not adept at providing numerically accurate answers to data queries. However, numerically accurate answers are essential to managing a cloud RAN.

The present application solves these and other problems by addressing each challenge above. As will be described more thoroughly below, the challenge associated with specialized information is addressed by providing metric definitions as additional context to the NL query. The huge data issue is addressed by using, for example, semantic search mechanisms to limit the number of counters needed for processing by the foundation model. To improve mathematical accuracy of model output, the foundation model is used to generate query code (e.g., SQL or KQL), rather than outputting the ultimate answer to the NL query. The query code may then be executed on the operator data to obtain a mathematically accurate answer to the NL query. In aspects, guardrails (e.g., expert feedback) are implemented to fine-tune the query code output and continuously improve answer accuracy. It should be appreciated that fundamental issues associated with querying 5G operator data may also be presented in other massive data-collection scenarios, such as data analytics pipelines (e.g., for streamed video data), power-grid management, air-traffic control, and the like. The present technology may be similarly suitable to enable NL data queries on other massive datasets.

In examples, a generative model (also generally referred to herein as a type of machine learning (ML) model) may be used according to aspects described herein and may generate any of a variety of output types (and may thus be a multimodal generative model, in some examples). For example, the generative model may include a generative transformer model and/or a large language model (LLM), a generative image model, or the like. Example ML models include, but are not limited to, Megatron-Turing Natural Language Generation model (MT-NLG), Generative Pre-trained Transformer 3 (GPT-3), Generative Pre-trained Transformer 4 (GPT-4), BigScience BLOOM (Large Open-science Open-access Multilingual Language Model), DALL-E, DALL-E 2, Stable Diffusion, or Jukebox. Additional examples of such aspects are discussed below with respect to the generative ML model illustrated in FIGS. 5A-5B.

FIG. 1 illustrates an overview of an example system 100 in which one or more machine learning (ML) models may be used to improve network management of a cloud RAN according to aspects of the present disclosure. Cell towers 102A-C transmit and receive wireless communications with user device(s) 106 (e.g., mobile device, PDA, laptop computer, watch, etc.), IoT device(s) 104 (e.g., video cameras, health monitors, appliances, etc.), and other wireless-enabled devices, over a telecommunications network. In aspects, one or more operators 108A-E may manage the one or more cell towers 102A-C. The example system 100 further includes on-premises edges 110A-B (including edge servers 116A-B), a network edge 130 (including core network servers 134), and a cloud 150 (including cloud servers 154 responsible for providing cloud services). In aspects, example system 100 corresponds to a cloud RAN infrastructure for a mobile wireless telecommunication network.

As illustrated, the on-premises edges 110A-B (or "on-prem" edges 110A-B) are datacenters that enable cloud integration with a radio access network (RAN). The on-prem edges 110A-B include on-prem edge servers 116A-B, which process incoming and outgoing data traffic from the cell towers 102A-C. In aspects, the on-premises edges 110A-B are generally geographically remote from the datacenters associated with the core network (e.g., network edge 130) and cloud services (e.g., cloud 150). The remote site is in geographic proximity to respective cell towers 102A-C. For example, the proximity may be within about a few kilometers. As illustrated, the on-premises edge 110A is in proximity to the cell tower 102A and the on-premises edge 110B is in proximity to the cell towers 102B-C. In some aspects, the same or different operators 108A-E may manage on-premises edges 110A-B and cell towers 102A-C.

The on-prem edge servers 116A-B may execute service applications 120A-B, which may include any number of network monitoring or management functions. In aspects, one or more metric monitors 122A-B may respectively monitor a plethora of different metrics associated with operating a cloud RAN, including node-level data, gNodeB level data, user level data, and flow-level data, which are utilized for network monitoring, evaluating key performance indicators (KPIs), and nodes management. In examples, the metrics are also used for customer billing, policy monitoring and enforcement, consumption trends analysis for different traffic types, and debugging. Each metric monitor 122A-B may compute numerous counters for each metric, accounting for substantial data transfer within the system 100. In aspects, metric monitors 122A-B transmit the operator metric data to an upstream server (e.g., the servers 134 of the network edge 130). In other aspects, service application 140 of network edge 130 may implement one or more metric monitors for collecting operator metric data (not shown). The operator metric data (or metric data) may refer to any data collected or compiled for any metric or counter associated with operating a 5G multi-access edge computing system (e.g., cloud RAN). To process operator queries (e.g., a NL query by operator 108D managing on-premises edge server 116A), service applications 120A-B may further implement context extractors (e.g., such as context extractor 142 or context extractor 162, described below), prompt creators (e.g., such as prompt creator 144 or prompt creator 164), and/or ML output generators (e.g., ML output generator 146 or ML output generator 166). In other cases, based on the limited resources available on the on-prem edges 110A-B, these functions may be performed upstream on the network edge 130 or cloud 150.

As described further herein, one or more foundation models may be used to generate a code query based on relevant metrics for answering a NL query. In aspects, rather than being generated at the on-prem edges 116A-B, the code query may be generated at the network edge 130 and/or cloud 150. The code output by the one or more foundation models, however, may be executed by on-premises edge servers 116A-B running one or more code executors 124A-B. In aspects, the code executors 124A-B may execute code queries (e.g., SQL or KQL queries) against relevant metrics across the cloud RAN, e.g., stored on the on-premises edges 110A-B, compiled in large databases (e.g., stored in metric database 134 on the network edge 130 or in metric database 174 on cloud 150), or any other metric data lake or store accessible to the code executors 124A-B. Based on the technologies disclosed herein, executing code queries against relevant metrics may provide a mathematically accurate response (e.g., answer) to the NL query received from operator 108D. Additionally, dashboard generators 126A-B may generate one or more dashboards for visually presenting the answer to the operator 108D based on the NL query.

In aspects, the network edge 130 is at a regional datacenter of a private cloud service. For example, the regional datacenter may be about tens of kilometers from the cell towers 102A-C. The network edge 130 may comprise memory resources that are more expansive than the memory resources available to the edge servers 116A-B of the on-premises edges 110A-B. The network edge 130 includes service application 140 that when executed performs network management functions, such as network planning, based on evaluating network metric data. In aspects, operator 108E may manage the core network by querying the metric data. In some cases, NL queries by operator 108E may be processed on cloud 150, as described below; in other cases, the network edge 130 may include functionality for processing NL queries. For example, in response to a NL query from operator 108E, the service application 140 may execute a context extractor 142, which extracts context for the NL query using machine learning technologies based on domain database 136. In aspects, domain database 136 may include a compilation of metric definitions associated with the metric data. The metric definitions may include metric counter names, types, descriptions, labels, etc., represented by the metric data.

Service application 140 may further implement prompt creator 144, which may create a first prompt to a ML model (e.g., a foundation model in model cache 132) based on the NL query and the extracted context (e.g., metrics that are semantically similar to the NL query). ML output generator 146 may utilize the foundation model to process the first prompt to output relevant metrics associated with answering the NL query. Prompt creator 144 may then create a second prompt to the same or different ML model (e.g., the same or different foundation model in model cache 132) based on the NL query and the relevant metrics. In some cases, the second prompt may be formatted to request code output (e.g., formatted as an SQL or KQL query) from the same or different ML model. The ML output generator 146 may then output a code query corresponding to the NL query, the code query formatted as an SQL or KQL query for querying the relevant metrics to answer the NL query, for example.

In some aspects, the service application 140 of the network edge 130 may implement a code executor 147 to execute the code output (e.g., SQL or KQL query) against the relevant metrics across the cloud RAN, e.g., stored on the on-premises edge, compiled in large databases (e.g., stored in metric database 134 on the network edge 130 or in metric database 174 on cloud 150), or any other metric data lake or store accessible to the code executor 147. In other aspects, ML generator 146 may provide the code output to code executors associated with other components of the cloud RAN, e.g., code executor 124A associated with on-prem edge 110A and/or code executor 124B associated with on-prem edge 110B. In aspects, executing code queries against relevant metrics may provide a mathematically accurate response (e.g., answer) to the NL query received from operator 108E. In further aspects, dashboard generator 148 may generate a dashboard for visually presenting the answer(s) to operator 108E based on the NL query.

The cloud 150 (service) includes cloud servers 154 for performing resource-intensive, non-real-time service operations, such as data analytics. In aspects, one or more servers 154 in the cloud 150 may be at a central location in a cloud RAN infrastructure. In this case, the central locations may be hundreds of kilometers from the cell towers 102A-C. In aspects, the cloud 150 includes service application 160 that when executed performs network management functions, such as network planning, based on evaluating network metric data. The service application 160 may perform similar processing tasks as a service application 140 in the network edge 130. In examples, any of operators 108A-E may manage aspects of the cloud RAN. For example, as illustrated, operator 108A may manage cell tower 102A, operator 108B may manage cell tower 102B, operator 108C may manage cell tower 102C, operator 108D may manage on-prem edge 110A and/or on-prem edge 110B, operator 108E may manage the core network on network edge 130. In aspects, any of operators 108A-E may need to query metric data to manage one or more components of the cloud RAN.

Due to the additional resources available, cloud servers 154 may process NL queries from operators. For example, in response to a NL query from any of the operators 108A-E, the service application 160 may execute a context extractor 162 (e.g., similar to context extractor 142), which extracts context for the NL query using machine learning technologies based on domain database 176. Similar to domain database 136 described above, domain database 176 may include a compilation of metric definitions associated with metric data collected across the cloud RAN. The metric definitions may include metric counter names, types, descriptions, labels, etc., represented by the metric data. Service application 160 may further implement prompt creator 164 (similar to prompt creator 144), which may create a first prompt to a ML model (e.g., a foundation model in model repository 172) based on the NL query and the extracted context (e.g., metrics semantically similar to the NL query). ML output generator 166 (similar to ML output generator 146) may utilize the foundation model to process the first prompt to output relevant metrics associated with answering the NL query. Prompt creator 164 may then create a second prompt to the same or different ML model (e.g., same or different foundation model in model repository 172) based on the NL query and the relevant metrics. In some cases, the second prompt may be formatted to request code output (e.g., formatted as an SQL or KQL query) from the same or different ML model. The ML output generator 166 may then output a code query corresponding to the NL query, the code query formatted as an SQL or KQL query for querying the relevant metrics to answer the NL query, for example.

In some aspects, ML generator 166 may provide the code output to code executors associated with other components of the cloud RAN, e.g., code executor 147 associated with network edge 130, code executor 124A associated with on-prem edge 110A, and/or code executor 124B associated with on-prem edge 110B. In aspects, executing code queries against the metric data may provide a mathematically accurate response (e.g., answer) to the NL query received from operators 108A-E. In further aspects, a dashboard generator (such as dashboard generator 126A associated with on-prem edge 110A, dashboard generator 126B associated with on-prem edge 110B, and/or dashboard generator 148 associated with network edge 130) may generate a dashboard for visually presenting the answer(s) to operators 108A-E based on the NL query.

While FIG. 1 is described with reference to a cloud RAN architecture, other distributed architectures for which large amounts of data are collected and analyzed could similarly implement the technology described herein, e.g., using one or more foundation models, context extractors, prompt creators, ML output generators, code executors, and/or dashboard generators. As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

FIG. 2A illustrates an overview 200A of example metric definitions associated with metric data collected for managing a cloud RAN according to aspects described herein. As detailed above, operators managing MEC systems collect vast amounts of data, e.g., node-level data, gNodeB level data, user level data, and flow-level data, which are utilized for network monitoring, evaluating key performance indicators (KPIs), and nodes management (e.g., monitoring capacity for network planning). The number of counters and metrics regularly computed runs into thousands for a commercial operator network, with more than 6,000 metrics and counters being collected, accounting for tens of Gbps of data transfer. Furthermore, each counter may have a complex name, complicating the task of executing queries on appropriate metrics to obtain relevant and accurate information regarding the network.

As illustrated by FIG. 2A, each metric may be associated with a definition, including a name, type, description, label(s), and the like. For example, metric 202A has a name 204A of "amfcc_nsmf_pdusession_retrieve_sm_context_request" and a type 206A of "64-bit counter." Metric 202A is further associated with description 208A based on the 3GPP of: "The number of retrieve SM context requests sent by AMF. The request message body carries SMContextRetrieveData structure as defined in section 6.1.6.2.7 of 3GPP TS 29.502." Label(s) 210A of "dnn, slice, peer" are also associated with metric 202A.

As further illustrated by FIG. 2A, metric 202B has a name 204B of "amfcc_nsmf_pdusession_retrieve_sm_context_response" and a type 206B of "64-bit counter." Metric 202B is further associated with description 208B based on the 3GPP of: "The number of retrieve SM context responses received by AMF. On success, request message body contains SMContextRetrieveData structure as defined in section 6.1.6.2.27 of 3GPP TS 29.502. On failure, response message body contains ProblemDetails structure as defined in section 5.2.4.1 of 3GPP TS 29.571." Label(s) 210B of "dnn, slice, peer, result" are associated further with metric 202B.

Some metric definitions, as noted above, may be proprietary whereas other metric definitions may be publicly available (e.g., 3GPP definitions). In aspects of the present disclosure, public and/or private metric definitions associated with the massive number of computed metrics for a cloud RAN may be compiled in a metric definition database 201.

Figure 2B:
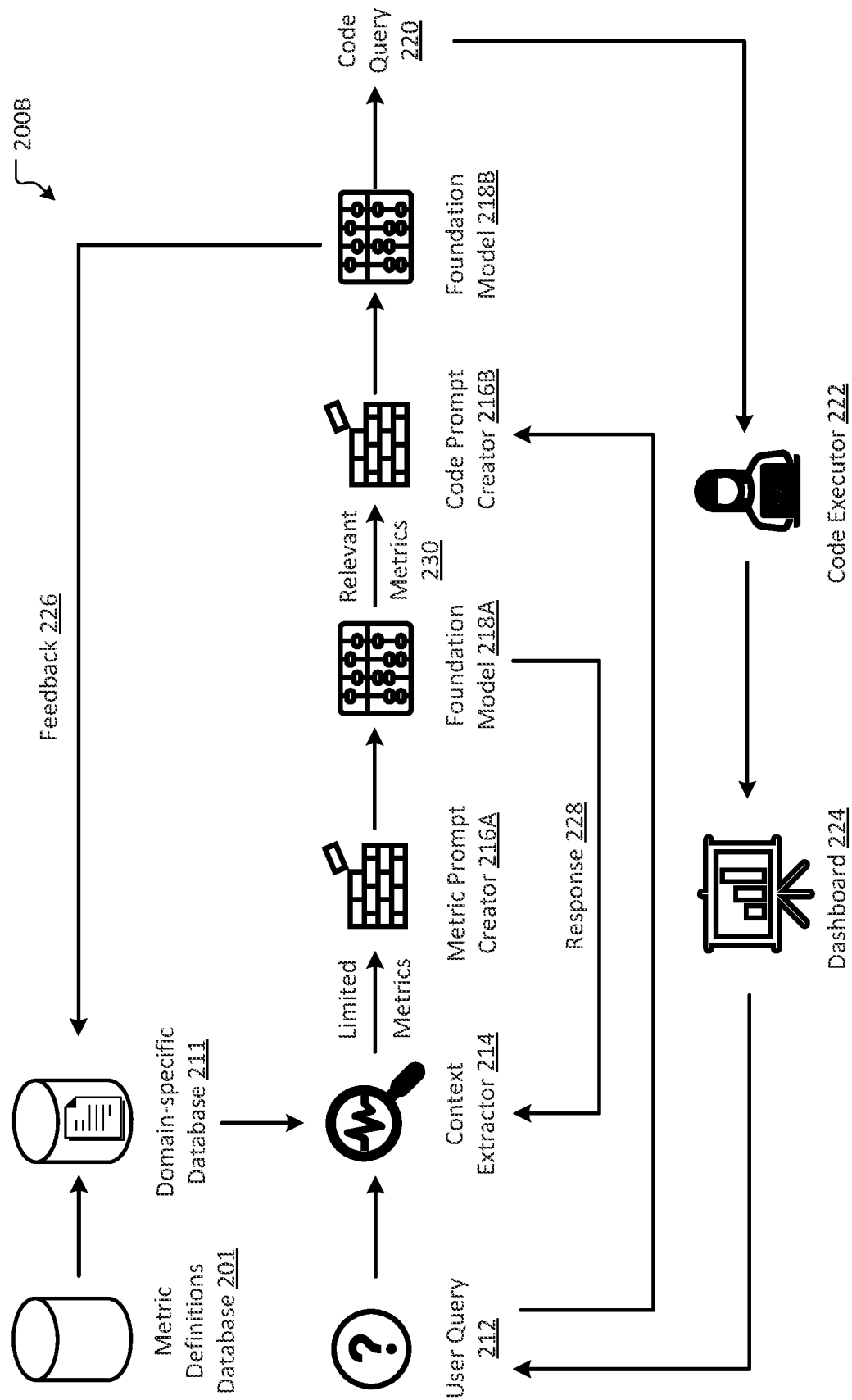
FIG. 2B illustrates an overview of an example conceptual architecture for using one or more ML models to increase answer accuracy for NL queries on large datasets according to aspects described herein.

FIG. 2B illustrates an overview 200B of an example conceptual architecture for using one or more ML models to increase answer accuracy for NL queries on large datasets according to aspects described herein. As illustrated by FIG.

2B, metric definition database 201 (of FIG. 2A) may include public and/or private metric definitions associated with the massive number of computed metrics for a cloud RAN. The metric definition database 201 may be utilized to build a domain-specific database 211 for a particular public or private network. In some aspects, metric definitions of the domain-specific database 211 may be converted into word embeddings, which may be compared (e.g., via cosine similarity matching) to word embeddings of a received NL query, as described further below. In this way, metrics corresponding to metric definitions that are semantically similar to a received NL query may be determined.

In other aspects, the domain-specific database 211 may be, or may be used to create, a semantic memory store of semantic embeddings (also referred to herein as "semantic addresses") corresponding to one or more context objects associated with foundation model 218A and/or foundation model 218B (where foundation models 218A-B may be the same or different foundation models). In examples, an entry in a semantic memory store includes one or more semantic embeddings corresponding to a context object itself or a reference to the context object, among other examples. In examples, a semantic memory store stores embeddings that are associated with one or more foundation models and their specific versions, which may thus represent the same or similar context but in varying semantic embedding spaces (e.g., as is associated with each model/version). Further, when a new model is added or an existing model is updated, one or more entries within the semantic memory store may be reencoded (e.g., by generating a new semantic embedding according to the new embedding space). For example, response 228 and/or feedback 226 may cause entries within the semantic memory store to be reencoded. In this manner, a single context object entry within the semantic memory store may have a locatable semantic address across models/versions, thereby enabling retrieval of context objects based on a similarity determination (e.g., as a result of an algorithmic comparison) between a corresponding semantic address and a semantic context indication.

As illustrated by FIG. 2B, a user query 212 may be received by context extractor 214. The user query 212 may be a natural language (NL) query from an operator of a cloud RAN, for instance. Context extractor 214 filters the documentation stored by the domain-specific database 211 to limit a size of a first prompt to the foundation model 218A. In some aspects, context extractor 214 extracts metrics whose descriptions are semantically close to user query 212. In an example, context extractor 214 converts metric definitions of the domain-specific database 211 and user query 212 into word embeddings represented by vectors. A cosine similarity may be performed to obtain vectors in the domain-specific database 211 that are closest to a vector representing the user query 212. In other examples, context extractor 214 may be associated with a recall engine for identifying embeddings in a semantic memory store to determine semantically similar metric definitions in the domain-specific database 211.

Metrics corresponding to metric definitions that are semantically close to the user query 212 may be extracted as context from the domain-specific database 211. The extracted metric context may be used by metric prompt creator 216A to generate a first prompt to foundation model 218A. For example, the first prompt may be created based on a prompt template, including one or more fields, regions, and/or other parts that may be populated (e.g., with input and/or context), thereby generating the first prompt. In aspects, the first prompt may include user query 212 and the semantically similar metrics (e.g., metric context) identified by context extractor 214. In further aspects, a size of the first prompt may be limited based on the metric context extracted from the domain-specific database 211.

In response to the first prompt, foundation model 218 outputs one or more relevant metrics 230 that are relevant to answering the user query 212. In some aspects, the one or more relevant metrics 230 may be provided as a response to context extractor 214, which may cause embeddings in the domain-specific database 211 (and/or a semantic memory store) to be updated, as described above. In further aspects, the relevant metrics 230 are used by code prompt creator 216B (which may be the same or different from code prompt creator 216A) as context for generating a second prompt.

In this case, the second prompt may include user query 212 and relevant metrics 230. However, rather than being formatted to receive an answer to user query 212, the second prompt may be formatted to return code output. That is, based on a prompt template or otherwise, the second prompt may be used to prime foundation model 218B to output a code query 220 corresponding to the user query 212. A code query can be described as a set of statements in a particular order and format designed to obtain data from a database. For example, code query 220 may be formatted as an SQL or KQL query designed to obtain an answer to the user query 212 based on querying the relevant metrics 230. The code query 220 may be output to code executor 222 (e.g., similar to code executors 124A-B and code executor 147 of FIG. 1). Additionally, code query 220 may be evaluated by an expert, for example, and provided as feedback 226 to enhance or tune domain-specific database 211, for example. Code executor 222 may execute code query 220 on the relevant metrics 230 to obtain an answer to the user query 212. The answer may further be visualized by generating an appropriate dashboard 224. Since the relevant metrics 230 are output by foundation model 218A as relevant to answering the user query 212, and code query 220 is well formed by the foundation model 218B for querying the relevant metrics 230, execution of code query 220 on the relevant metrics returns an answer to the user query 212 with improved accuracy.

Expanding on the use case described above, in response to the simple question regarding how many protocol data unit (PDU) sessions there are at a given time, the system first outputs the relevant metric(s) to look at and describes what the metric(s) collect. Then, the system outputs a code query based on the relevant metrics. Upon executing the code query, the system provides a dashboard displaying a time-series of the requested data as well as the code query it executed to obtain the data. Customized or second order questions can also be posed by an operator, e.g., "what is the average uplink throughput." The system understands that tput_ul is the relevant metric (e.g., first output) and generates a code query on the metric (e.g., second output). Upon executing the code query to obtain the metric data, the system calculates the average and displays a mathematically accurate answer to the NL query. The dashboard is updated with the relevant time-series data of uplink throughput as well as the average. In this way, the disclosed technology leverages the benefits of foundation models (e.g., entity recognition, natural language understanding, and outputting well-formed code queries), while overcoming deficiencies of such models (e.g., inability to process complex data and fields, mathematical inaccuracy) to generate accurate answers to NL data queries.

Figure 3:
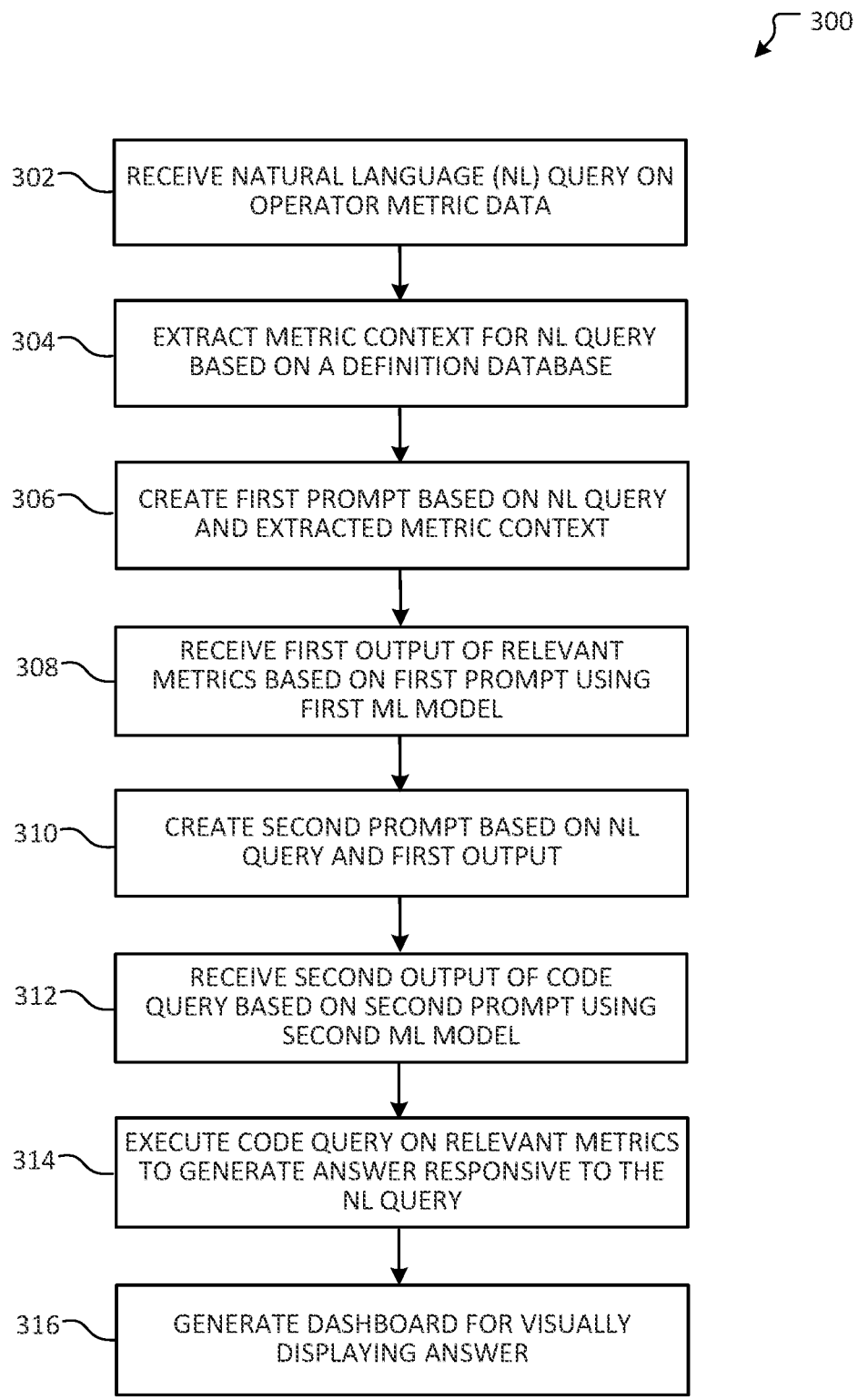
FIG. 3 illustrates an overview of a first example method for using one or more ML models to generate answers to data queries on large datasets according to aspects described herein.

FIG. 3 illustrates an overview of a first example method 300 for using one or more ML models to generate answers to data queries on large datasets according to aspects described herein. In examples, aspects of method 300 are performed by context extractors (e.g., context extractors 142, 162 of FIG. 1 and context extractor 214 of FIG. 2B), prompt creators (e.g., prompt creators 144, 164 of FIG. 1 and prompt creators 216A-B of FIG. 2B), ML output generators (e.g., ML output generators 146, 166 of FIG. 1 and foundation models 218A-B of FIG. 2B), code executors (e.g., code executors 124A-B, 147 of FIG. 1 and code executor 222 of FIG. 2B), dashboard generators (e.g., dashboard generators 126A-B, 148 of FIG. 1), among other examples.

As illustrated, method 300 begins at receive operation 302, where a natural language (NL) query is received. As noted above, operators managing MEC systems for a cloud RAN collect vast amounts of data, e.g., node-level data, gNodeB level data, user level data, and flow-level data, which are utilized for network monitoring, evaluating key performance indicators (KPIs), and nodes management (e.g., monitoring capacity for network planning). In examples, the metric data is also used for customer billing, policy monitoring and enforcement, consumption trends analysis for different types of traffic, and debugging. To manage such systems, operators continually retrieve and visualize information and values of different metrics. In examples, the NL query may be received from an operator seeking metric information for managing some aspect of a cloud RAN.

At extract context operation 304, context for the NL query is extracted based on a definition database. As described above, the definition database may include public and/or private metric definitions associated with a massive number of computed metrics for a cloud RAN. In some aspects, the definition database may be utilized to build a domain-specific database for a particular public or private network. In aspects, metrics whose descriptions are semantically close to the NL query may be extracted as context (e.g., metric context) for the NL query. For example, metric definitions of the definition database and the NL query may be converted into word embeddings represented by vectors. A cosine similarity may then be performed to obtain vectors in the definition database that are closest to a vector representing the NL query. In other aspects, a recall engine may be used to identify embeddings in a semantic memory store to determine semantically similar metric definitions in the definition database. In this way, metrics corresponding to metric definitions that are semantically close to the NL query may be extracted as context (e.g., metric context) for processing the NL query.

At first create operation 306, a first prompt to a first ML model is created based on the NL query and the extracted metric context. For example, the first prompt may be created based on a prompt template, including one or more fields, regions, and/or other parts that may be populated (e.g., with input and/or context), thereby generating the first prompt. In aspects, the first prompt may include the NL query (or a representation of the NL query) and the extracted metric context (e.g., semantically similar metrics). In further aspects, a size of the first prompt may be limited based on the extracted metric context. Limiting the size of the first prompt is designed to prevent the first ML model (e.g., first foundation model) from being overwhelmed by processing a NL query over an extensive dataset, such as the massive amount of metric data computed for a cloud RAN. In this way, the first prompt enables a foundation model to process the NL query over a subset of the metric data, e.g., metric data associated with semantically similar metrics.

At receive first output operation 308, a first output is received from the first ML model (e.g., first foundation model) based on the first prompt. In aspects, the first output may include one or more metrics relevant to computing an answer to the NL query. For example, applying the NL query to metric data associated with the one or more relevant metrics may generate an answer responsive to the NL query.

At second create operation 310, a second prompt to a second ML model is created based on the NL query and the first output (e.g., the one or more relevant metrics). In aspects, the second prompt is formatted to request code output (e.g., formatted as an SQL or KQL query) from the second ML model, where the second ML model may be the same or different from the first ML model. That is, rather than being formatted to receive an answer to the NL query, the second prompt may be formatted to return code output. For example, based on a prompt template or otherwise, the second prompt may be used to prime the second ML model to output a code query corresponding to the user query. A code query can be described as a set of statements in a particular order and format designed to obtain data from a database. In aspects, combining the statements in the particular order and format is non-trivial and may traditionally be performed by an expert.

At receive second output operation 312, a second output is received from the second ML model (e.g., second foundation model) based on the second prompt. In aspects, the second output comprises a code query. For example, the code query may be formatted as an SQL or KQL query designed to obtain an answer to the NL query based on querying metric data associated with the one or more relevant metrics. In aspects, the second output is a well-formed code query which combines the set of statements in the particular order and format for querying the metric data without relying on an expert. In other aspects, the second output is a partially well-formed code query and feedback from an expert is used to train the second ML model and/or enhance the definition database to better generate a code query.

At execute operation 314, the code query is executed to generate an answer responsive to the NL query. For example, the code query may be executed to query metric data associated with the one or more relevant metrics to generate the answer responsive to the NL query. In aspects, the answer is a mathematically accurate answer to the NL query. In further aspects, the answer is a more accurate answer than an answer generated directly by the second ML model based on the NL query and the one or more relevant metrics.

At generate operation 316, a dashboard is generated for visually representing the answer. In some aspects, the dashboard may include the metric data returned for generating the answer. In further aspects, the dashboard may include the code query used to generate the answer. In still further aspects, the dashboard may be updated with real-time metric data and the answer may automatically be updated based on the real-time metric data.

Figure 4:
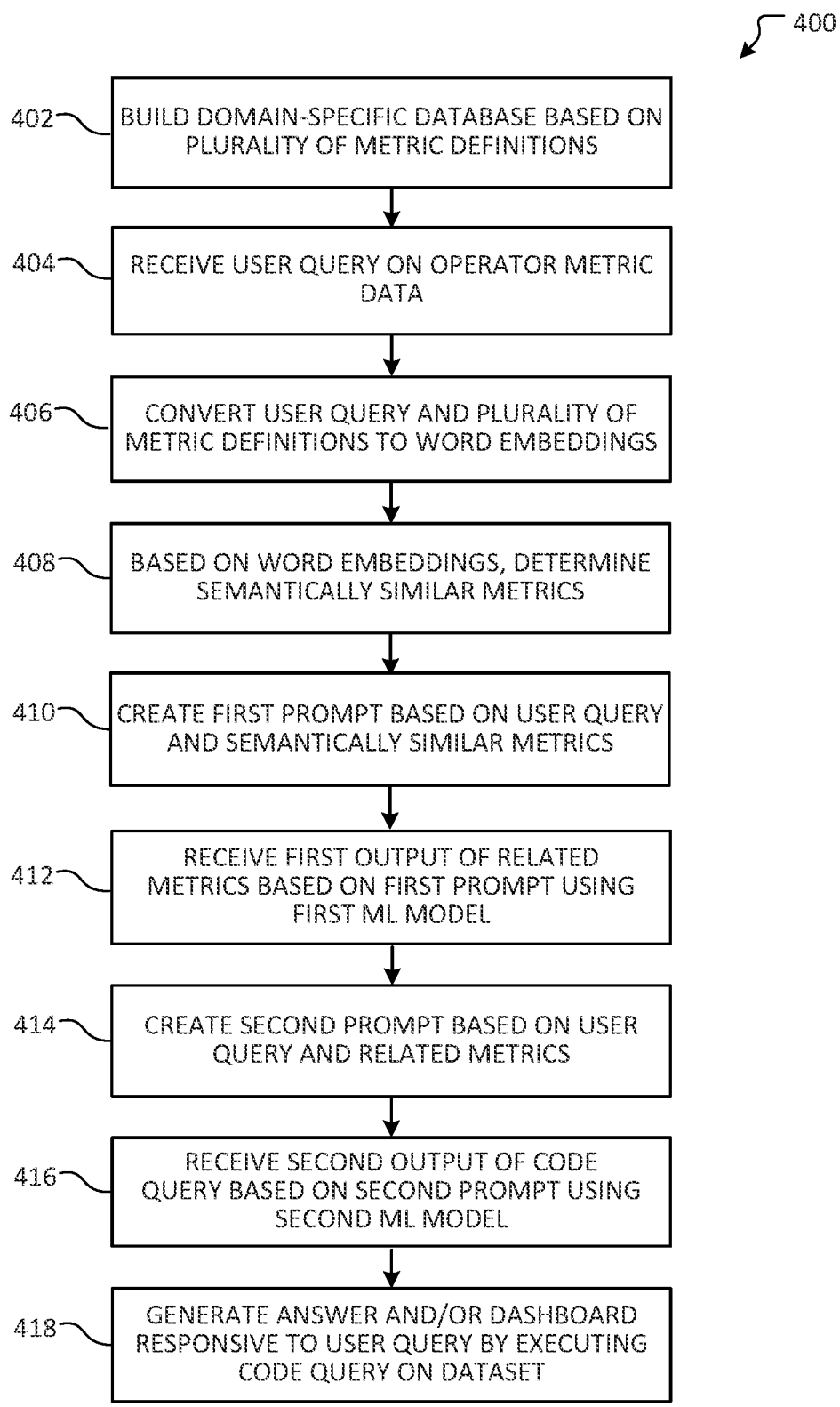
FIG. 4 illustrates an overview of a second example method for using one or more ML models to generate answers to data queries on large datasets according to aspects described herein.

FIG. 4 illustrates an overview of a second example method 400 for using one or more ML models to generate answers to data queries on large datasets according to aspects described herein. In examples, aspects of method 300 are performed by context extractors (e.g., context extractors 142, 162 of FIG. 1 and context extractor 214 of FIG. 2B), prompt creators (e.g., prompt creators 144, 164 of FIG. 1 and prompt creators 216A-B of FIG. 2B), ML output generators (e.g., ML output generators 146, 166 of FIG. 1 and foundation models 218A-B of FIG. 2B), code executors (e.g., code executors 124A-B, 147 of FIG. 1 and code executor 222 of FIG. 2B), dashboard generators (e.g., dashboard generators 126A-B, 148 of FIG. 1), among other examples.

As illustrated, method 400 begins at build operation 402, where a domain-specific database is built based on a plurality of metric definitions. As described above, a definition database may include public and/or private metric definitions associated with a massive number of computed metrics for a cloud RAN. In some aspects, the definition database may be utilized to build the domain-specific database for a particular public or private network. In some aspects, metric definitions of the domain-specific database may be converted into word embeddings (e.g., vectors), which may be compared (e.g., via cosine similarity matching) to word embeddings of a received NL query, as described further below. In other aspects, the domain-specific database may be, or may be used to create, a semantic memory store of semantic embeddings (also referred to herein as "semantic addresses") corresponding to one or more context objects associated with one or more foundation models (e.g., a first foundation model and a second foundation model).

At receive query operation 404, a user query is received, where the user query may be a natural language (NL) query received from an operator of a cloud RAN. As noted above, operators managing MEC systems for a cloud RAN collect vast amounts of data, e.g., node-level data, gNodeB level data, user level data, and flow-level data, which are utilized for network monitoring, evaluating key performance indicators (KPIs), and nodes management (e.g., monitoring capacity for network planning). In examples, the metric data is also used for customer billing, policy monitoring and enforcement, consumption trends analysis for different types of traffic, and debugging. To manage such systems, operators continually retrieve and visualize information and values of different metrics.

At convert operation 406, metric definitions of the domain-specific database and the user query are converted into word embeddings (e.g., vectors). For example, each vector may include a plurality of dimensions uniquely representing a metric definition or the user query.

At determine operation 408, metrics having semantically similar metric definitions to the user query are determined. For example, a cosine similarity may be performed to obtain vectors in the definition database that are closest to a vector representing the user query. In other aspects, a recall engine may be used to identify embeddings in a semantic memory store to determine semantically similar metric definitions in the domain-specific database. In this way, metrics corresponding to metric definitions that are semantically close to the user query may be extracted as context (e.g., metric context) for processing the user query.

At first create operation 410, a first prompt to a first ML model is created based on the user query and the extracted metric context. For example, the first prompt may be created based on a prompt template, including one or more fields, regions, and/or other parts that may be populated (e.g., with input and/or context), thereby generating the first prompt. In aspects, the first prompt may include the user query (or a representation of the user query) and the extracted metric context (e.g., semantically similar metrics). In further aspects, a size of the first prompt may be limited based on the extracted metric context. Limiting the size of the first prompt is designed to prevent the first ML model (e.g., first foundation model) from being overwhelmed by processing the user query over an extensive dataset, such as the massive amount of metric data computed for a cloud RAN. In this way, the first prompt enables the first foundation model to process the user query over a subset of the metric data, e.g., metric data associated with semantically similar metrics.

At receive first output operation 412, a first output is received from the first ML model (e.g., first foundation model) based on the first prompt. In aspects, the first output may include one or more metrics relevant to computing an answer to the user query. For example, applying the user query to metric data associated with the one or more relevant metrics may generate an answer responsive to the user query.

At second create operation 414, a second prompt to a second ML model is created based on the user query and the first output (e.g., the one or more relevant metrics). In aspects, the second prompt is formatted to request code output (e.g., formatted as an SQL or KQL query) from the second ML model, where the second ML model may be the same or different from the first ML model. That is, rather than being formatted to receive an answer to the user query, the second prompt may be formatted to return code output. For example, based on a prompt template or otherwise, the second prompt may be used to prime the second ML model to output a code query corresponding to the user query. A code query can be described as a set of statements in a particular order and format designed to obtain data from a database. In aspects, combining the statements in the particular order and format is non-trivial and may traditionally be performed by an expert.

At receive second output operation 416, a second output is received from the second ML model (e.g., second foundation model) based on the second prompt. In aspects, the second output comprises a code query. For example, the code query may be formatted as an SQL or KQL query designed to obtain an answer to the user query based on querying metric data associated with the one or more relevant metrics. In aspects, the second output is a well-formed code query which combines the set of statements in the particular order and format for querying the metric data without relying on an expert. In other aspects, the second output is a partially well-formed code query and feedback from an expert is used to train the second ML model and/or enhance the domain-specific database to better generate a code query.

At generate operation 418, the code query is executed to generate an answer responsive to the user query. For example, the code query may be executed to query metric data associated with the one or more relevant metrics to generate the answer responsive to the user query. In aspects, the answer is a mathematically accurate answer to the user query. In further aspects, the answer is a more accurate answer than an answer generated directly by the second ML model based on the user query and the one or more relevant metrics. Additionally, at generate operation 418, a dashboard may be generated for visually representing the answer. In some aspects, the dashboard may include the metric data returned for generating the answer. In further aspects, the dashboard may include the code query used to generate the answer. In still further aspects, the dashboard may be updated with real-time metric data and the answer may automatically be updated based on the real-time metric data.

Figure 5A:
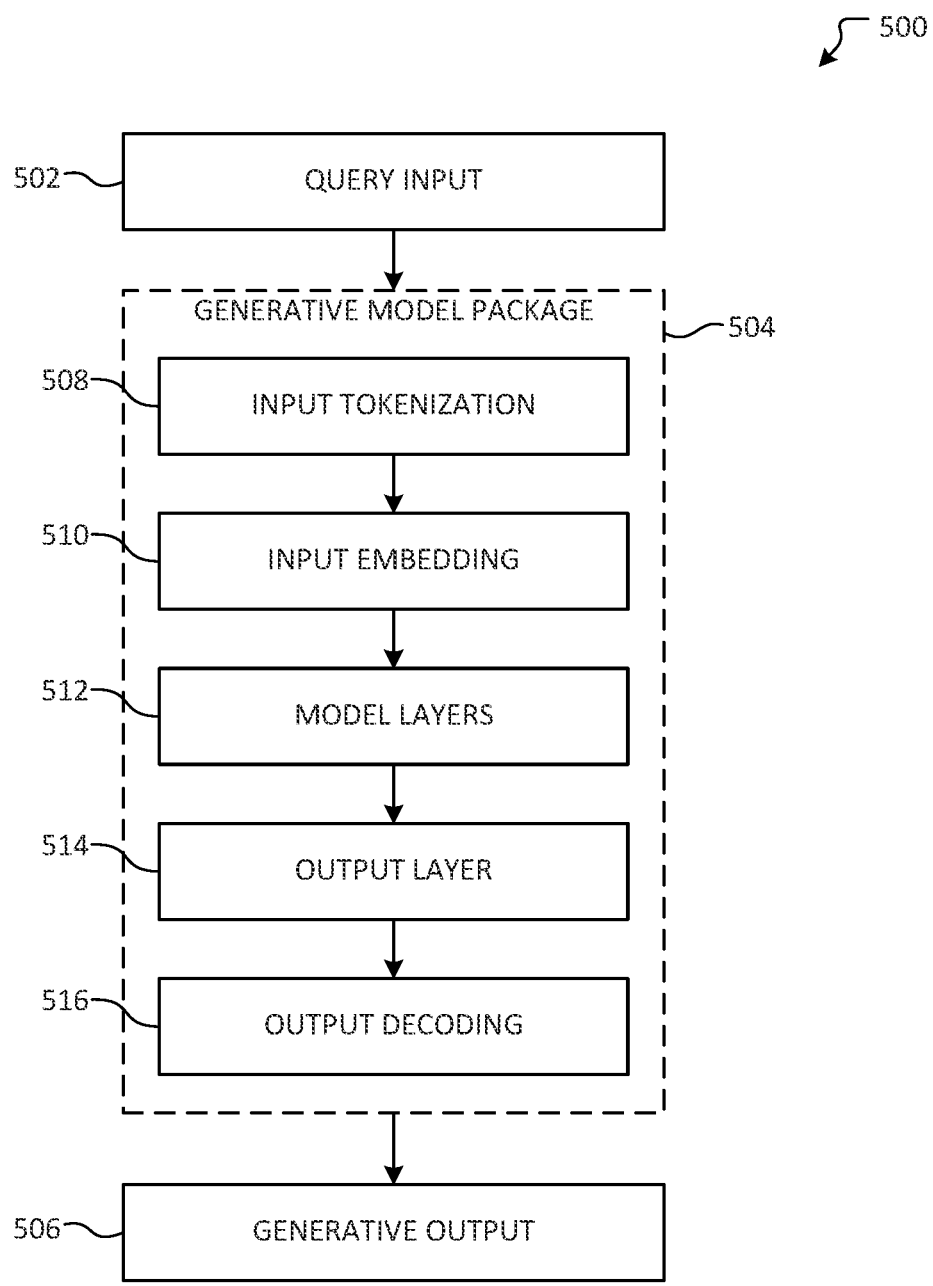
FIGS. 5A and 5B illustrate overviews of an example generative machine learning model that may be used according to aspects described herein.
Figure 5B:
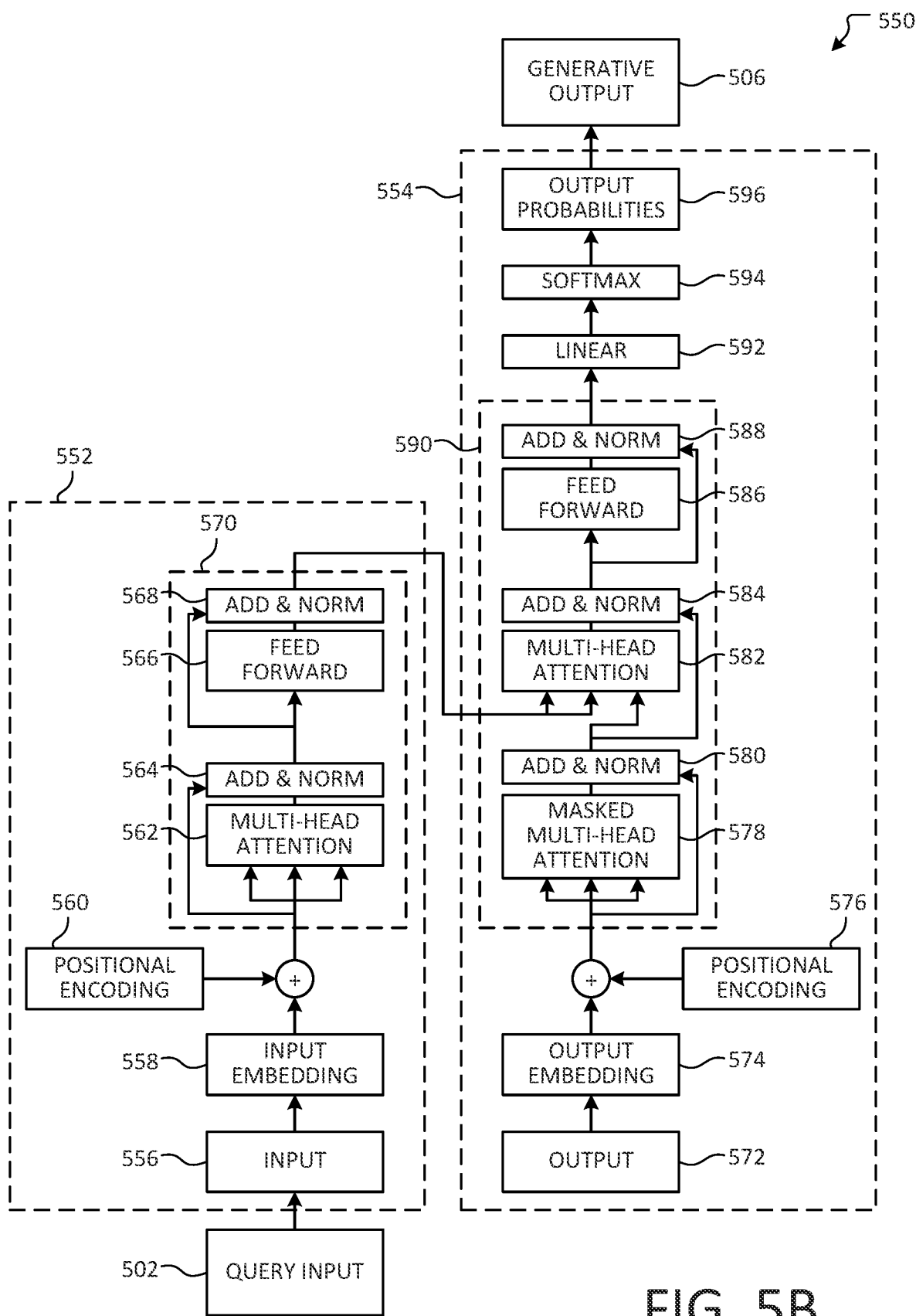

FIGS. 5A and 5B illustrate overviews of an example generative machine learning model that may be used according to aspects described herein. With reference first to FIG. 5A, conceptual diagram 500 depicts an overview of pre-trained generative model package 504 that processes a query input 502 and, for example, a prompt, to generate output 506 associated with generating answers to natural language queries on data, according to aspects described herein. Examples of pre-trained generative model package 504 includes, but is not limited to, Megatron-Turing Natural Language Generation model (MT-NLG), Generative Pre-trained Transformer 3 (GPT-3), Generative Pre-trained Transformer 4 (GPT-4), BigScience BLOOM (Large Openscience Open-access Multilingual Language Model), DALL-E, DALL-E 2, Stable Diffusion, or Jukebox.

In examples, generative model package 504 is pre-trained according to a variety of inputs (e.g., a variety of human languages, a variety of programming languages, and/or a variety of content types) and therefore need not be finetuned or trained for a specific scenario. Rather, generative model package 504 may be more generally pre-trained, such that query input 502 includes a prompt that is generated, selected, or otherwise engineered to induce generative model package 504 to produce certain generative output 506. For example, a prompt includes a context and/or one or more completion prefixes that thus preload generative model package 504 accordingly. As a result, generative model package 504 is induced to generate output based on the prompt that includes a predicted sequence of tokens (e.g., up to a token limit of generative model package 504) relating to the prompt. In examples, the predicted sequence of tokens is further processed (e.g., by output decoding 516) to yield generative output 506. For instance, each token is processed to identify a corresponding word, word fragment, or other content that forms at least a part of generative output 506. It will be appreciated that query input 502 and generative output 506 may each include any of a variety of content types, including, but not limited to, text output, image output, audio output, video output, programmatic output, and/or binary output, among other examples. In examples, query input 502 and generative output 506 may have different content types, as may be the case when generative model package 504 includes a generative multimodal machine learning model.

As such, generative model package 504 may be used in any of a variety of scenarios and, further, a different generative model package may be used in place of generative model package 504 without substantially modifying other associated aspects (e.g., similar to those described herein with respect to FIGS. 1, 2, 3, and 4). Accordingly, generative model package 504 operates as a tool with which machine learning processing is performed, in which certain inputs to generative model package 504 are programmatically generated or otherwise determined, thereby causing generative model package 504 to produce generative output 506 that may subsequently be used for further processing.

Generative model package 504 may be provided or otherwise used according to any of a variety of paradigms. For example, generative model package 504 may be used local to a computing device (e.g., on-prem edge servers 116A-B, network edge servers 134, or cloud servers 154) or may be accessed remotely from a machine learning service. In other examples, aspects of generative model package 504 are distributed across multiple computing devices. In some instances, generative model package 504 is accessible via an application programming interface (API), as may be provided by an operating system of a computing device and/or by the machine learning service, among other examples.

With reference now to the illustrated aspects of generative model package 504, generative model package 504 includes input tokenization 508, input embedding 510, model layers 512, output layer 514, and output decoding 516. In examples, input tokenization 508 processes query input 502 to generate input embedding 510, which includes a sequence of symbol representations that corresponds to query input 502. Accordingly, input embedding 510 is processed by model layers 512, output layer 514, and output decoding 516 to produce generative output 506. An example architecture corresponding to generative model package 504 is depicted in FIG. 5B, which is discussed below in further detail. Even so, it will be appreciated that the architectures that are illustrated and described herein are not to be taken in a limiting sense and, in other examples, any of a variety of other architectures may be used.

FIG. 5B is a conceptual diagram that depicts an example architecture 550 of a pre-trained generative machine learning model that may be used according to aspects described herein. As noted above, any of a variety of alternative architectures and corresponding ML models may be used in other examples without departing from the aspects described herein.

As illustrated, architecture 550 processes query input 502 to produce generative output 506, aspects of which were discussed above with respect to FIG. 5A. Architecture 550 is depicted as a transformer model that includes encoder 552 and decoder 554. Encoder 552 processes input embedding 558 (aspects of which may be similar to input embedding 510 in FIG. 5A), which includes a sequence of symbol representations that corresponds to input 556. In examples, input 556 includes query input 502 and a prompt, aspects of which may be similar to user query 212, metric context extracted from a definition database, a domain-specific database, or a semantic memory store, and/or a prompt that was generated based on a prompt template of a library according to aspects described herein.

Further, positional encoding 560 may introduce information about the relative and/or absolute position for tokens of input embedding 558. Similarly, output embedding 574 includes a sequence of symbol representations that correspond to output 572, while positional encoding 576 may similarly introduce information about the relative and/or absolute position for tokens of output embedding 574.

As illustrated, encoder 552 includes example layer 570. It will be appreciated that any number of such layers may be used, and that the depicted architecture is simplified for illustrative purposes. Example layer 570 includes two sub-layers: multi-head attention layer 562 and feed forward layer 566. In examples, a residual connection is included around each layer 562, 566, after which normalization layers 564 and 568, respectively, are included. Decoder 554 includes example layer 590. Similar to encoder 552, any number of such layers may be used in other examples, and the depicted architecture of decoder 554 is simplified for illustrative purposes. As illustrated, example layer 590 includes three sub-layers: masked multi-head attention layer 578, multi-head attention layer 582, and feed forward layer 586. Aspects of multi-head attention layer 582 and feed forward layer 586 may be similar to those discussed above with respect to multi-head attention layer 562 and feed forward layer 566, respectively. Additionally, masked multi-head attention layer 578 performs multi-head attention over the output of encoder 552 (e.g., output 572). In examples, masked multi-head attention layer 578 prevents positions from attending to subsequent positions. Such masking, combined with offsetting the embeddings (e.g., by one position, as illustrated by multi-head attention layer 582), may ensure that a prediction for a given position depends on known output for one or more positions that are less than the given position. As illustrated, residual connections are also included around layers 578, 582, and 586, after which normalization layers 580, 584, and 588, respectively, are included.

Multi-head attention layers 562, 578, and 582 may each linearly project queries, keys, and values using a set of linear projections to a corresponding dimension. Each linear projection may be processed using an attention function (e.g., dot-product or additive attention), thereby yielding n-dimensional output values for each linear projection. The resulting values may be concatenated and once again projected, such that the values are subsequently processed as illustrated in FIG. 5B (e.g., by a corresponding normalization layer 564, 580, or 584).

Feed forward layers 566 and 586 may each be a fully connected feed-forward network, which applies to each position. In examples, feed forward layers 566 and 586 each include a plurality of linear transformations with a rectified linear unit activation in between. In examples, each linear transformation is the same across different positions, while different parameters may be used as compared to other linear transformations of the feed-forward network.

Additionally, aspects of linear transformation 592 may be similar to the linear transformations discussed above with respect to multi-head attention layers 562, 578, and 582, as well as feed forward layers 566 and 586. Softmax 594 may further convert the output of linear transformation 592 to predicted next-token probabilities, as indicated by output probabilities 596. It will be appreciated that the illustrated architecture is provided in as an example and, in other examples, any of a variety of other model architectures may be used in accordance with the disclosed aspects. In some instances, multiple iterations of processing are performed according to the above-described aspects (e.g., using generative model package 504 in FIG. 5A or encoder 552 and decoder 554 in FIG. 5B) to generate a series of output tokens (e.g., words), for example which are then combined to yield a complete sentence (and/or any of a variety of other content). It will be appreciated that other generative models may generate multiple output tokens in a single iteration and may thus used a reduced number of iterations or a single iteration.

Accordingly, output probabilities 596 may thus form generative output 506 according to aspects described herein, such that the output of the generative ML model (e.g., which may include structured output) is used as input for subsequent processing (e.g., similar to operation 310 of FIG. 3 and operation 414 of FIG. 4) according to aspects described herein. In other examples, generative output 506 is provided as generated output after processing query input (e.g., similar to aspects of operation 308 of FIG. 3 and operation 412 of FIG. 4), which may further be processed according to the disclosed aspects.

Figure 6:
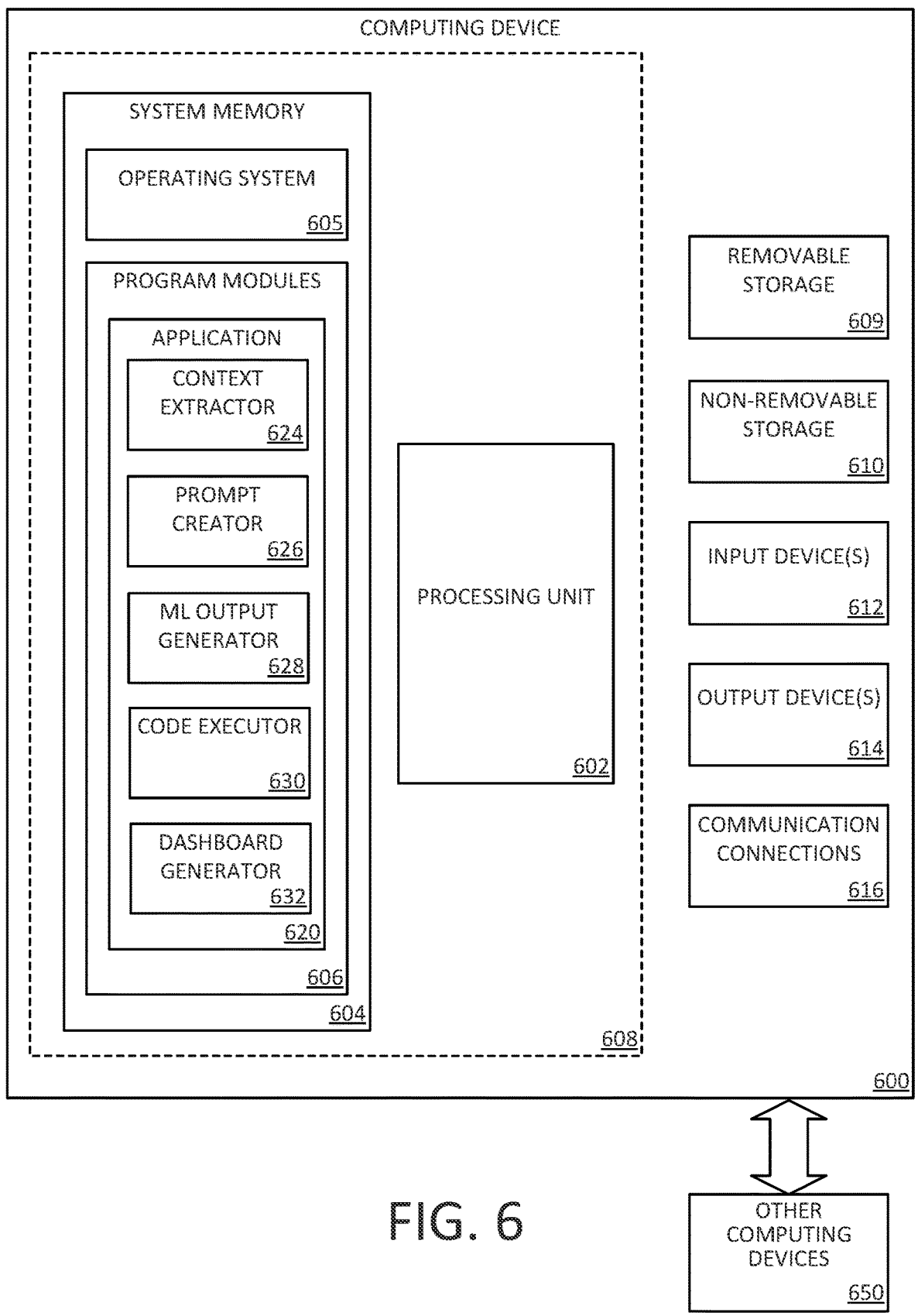
FIG. 6 is a block diagram illustrating example physical components of a computing device with which aspects of the disclosure may be practiced.
Figure 7:
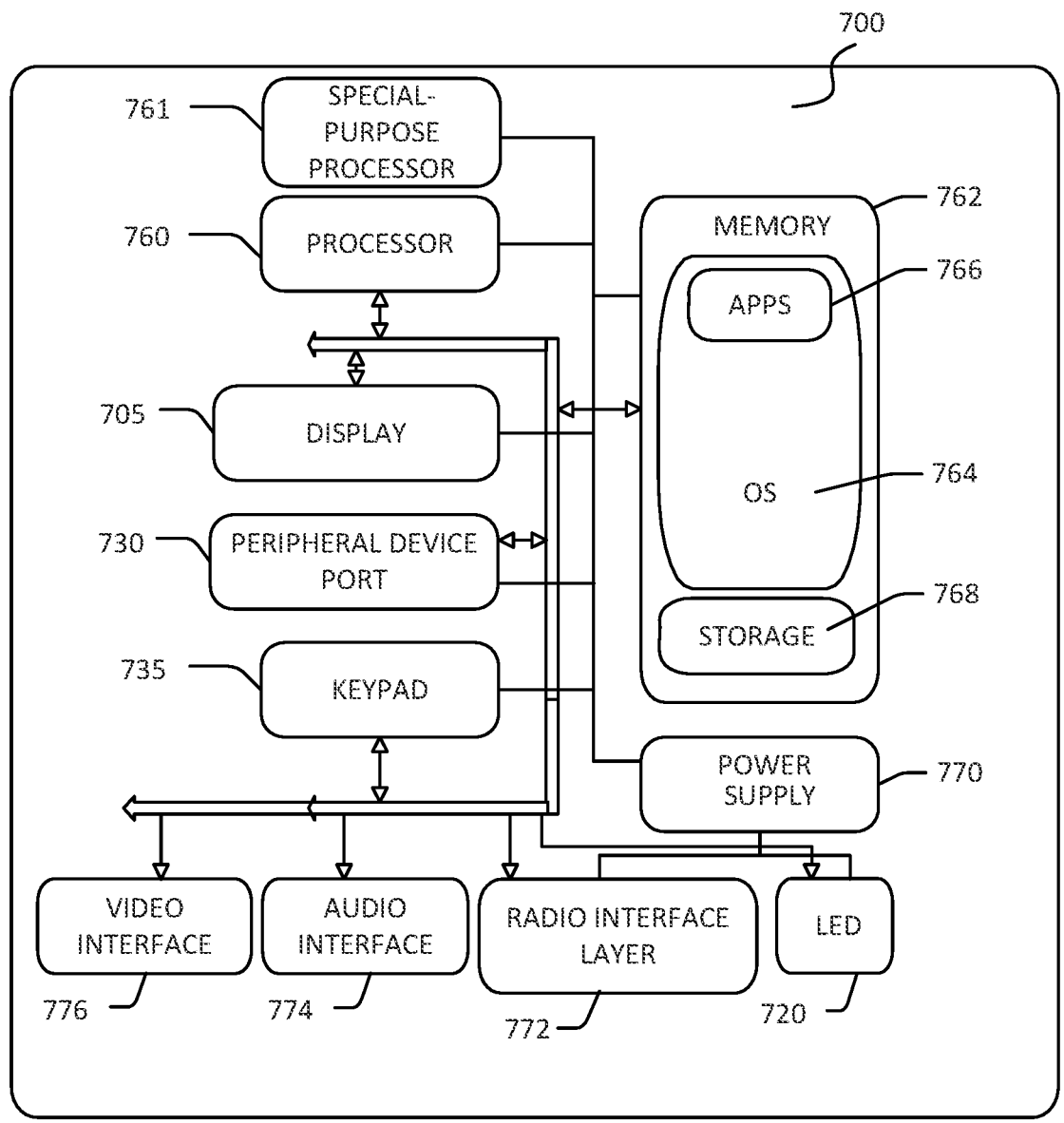
FIG. 7 is a simplified block diagram of a computing device with which aspects of the present disclosure may be practiced.
Figure 8:
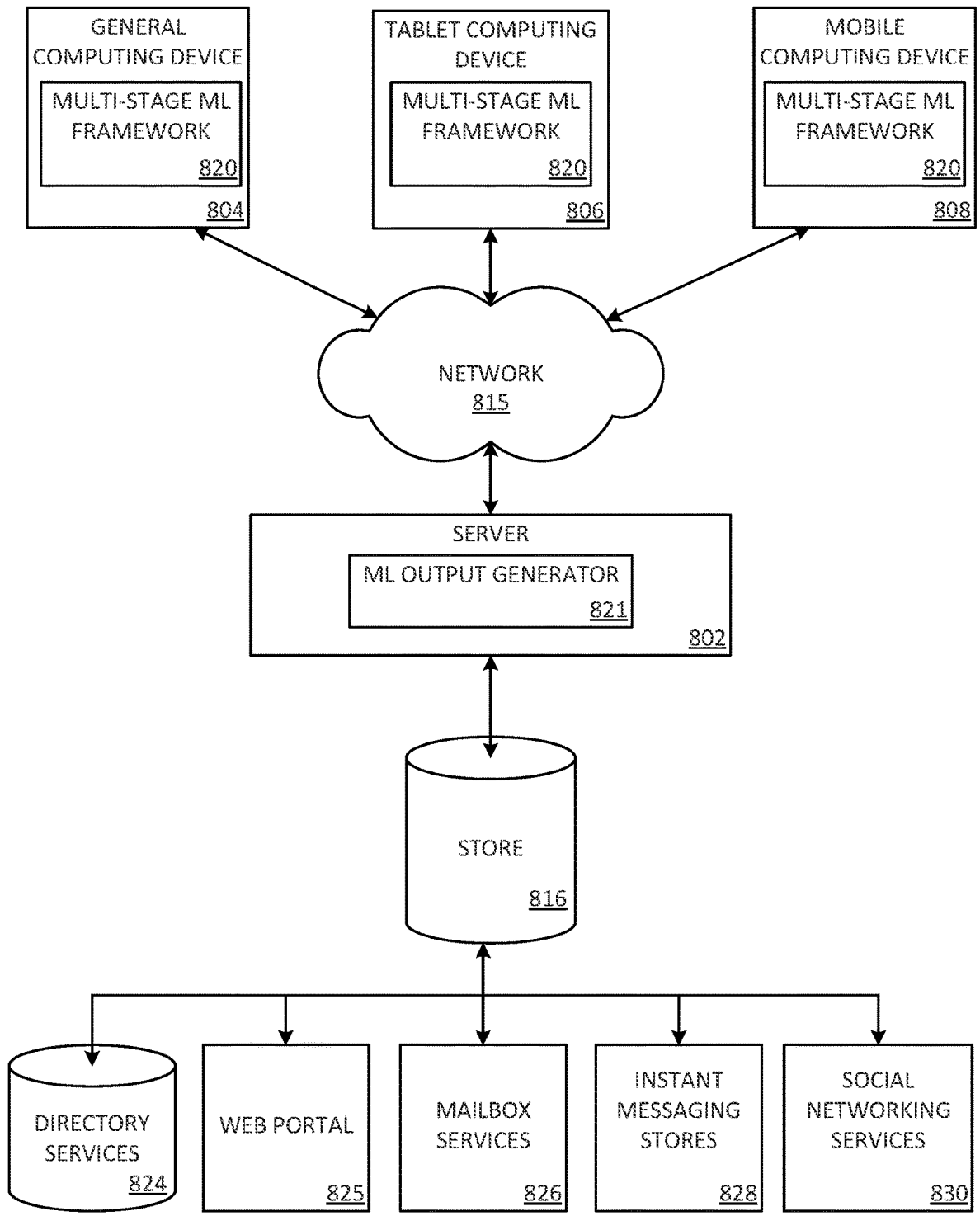
FIG. 8 is a simplified block diagram of a distributed computing system in which aspects of the present disclosure may be practiced.

FIGS. 6-8 and the associated descriptions provide a discussion of a variety of operating environments in which aspects of the disclosure may be practiced. However, the devices and systems illustrated and discussed with respect to FIGS. 6-8 are for purposes of example and illustration and are not limiting of a vast number of computing device configurations that may be utilized for practicing aspects of the disclosure, described herein.

FIG. 6 is a block diagram illustrating physical components (e.g., hardware) of a computing device 600 with which aspects of the disclosure may be practiced. The computing device components described below may be suitable for the computing devices described above, including one or more devices associated with a machine learning service, as well as computing devices (e.g., on-prem edge servers 116A-B, network edge servers 134, and/or cloud servers 154) discussed above with respect to FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, an application 620 (e.g., service application) may run various modules to perform functionalities described herein, such as a contract extractor 624, a prompt creator 626, a ML output generator 628, a code executor 630, and/or a dashboard generator 632. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include metric monitors, definition databases, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 7 illustrates a system 700 that may, for example, be a mobile computing device, such as a mobile telephone, a smart phone, wearable computer (such as a smart watch), a tablet computer, a laptop computer, and the like, with which embodiments of the disclosure may be practiced. In one embodiment, the system 700 is implemented as a "smart phone" capable of running one or more applications (e.g., browser, e-mail, calendaring, contact managers, messaging clients, games, and media clients/players). In some aspects, the system 700 is integrated as a computing device, such as an integrated personal digital assistant (PDA) and wireless phone.

In a basic configuration, such a mobile computing device is a handheld computer having both input elements and output elements. The system 700 typically includes a display 705 and one or more input buttons that allow the user to enter information into the system 700. The display 705 may also function as an input device (e.g., a touch screen display).

If included, an optional side input element allows further user input. For example, the side input element may be a rotary switch, a button, or any other type of manual input element. In alternative aspects, system 700 may incorporate more or less input elements. For example, the display 705 may not be a touch screen in some embodiments. In another example, an optional keypad 735 may also be included, which may be a physical keypad or a "soft" keypad generated on the touch screen display.

In various embodiments, the output elements include the display 705 for showing a graphical user interface (GUI), a visual indicator (e.g., a light emitting diode 720), and/or an audio transducer 725 (e.g., a speaker). In some aspects, a vibration transducer is included for providing the user with tactile feedback. In yet another aspect, input and/or output ports are included, such as an audio input (e.g., a microphone jack), an audio output (e.g., a headphone jack), and a video output (e.g., a HDMI port) for sending signals to or receiving signals from an external device.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 700 also includes a non-volatile storage area 768 within the memory 762. The non-volatile storage area 768 may be used to store persistent information that should not be lost if the system 700 is powered down. The application programs 766 may use and store information in the non-volatile storage area 768, such as e-mail or other messages used by an e-mail application, and the like. A synchronization application (not shown) also resides on the system 700 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the system 700 described herein.

The system 700 has a power supply 770, which may be implemented as one or more batteries. The power supply 770 might further include an external power source, such as an AC adapter or a powered docking cradle that supplements or recharges the batteries.

The system 700 may also include a radio interface layer 772 that performs the function of transmitting and receiving radio frequency communications. The radio interface layer 772 facilitates wireless connectivity between the system 700 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 700 may further include a video interface 776 that enables an operation of an on-board camera 730 to record still images, video stream, and the like.

It will be appreciated that system 700 may have additional features or functionality. For example, system 700 may also include additional data storage devices (removable and/or non-removable) such as, magnetic disks, optical disks, or tape. Such additional storage is illustrated in FIG. 7 by the non-volatile storage area 768.

Data/information generated or captured and stored via the system 700 may be stored locally, as described above, or the data may be stored on any number of storage media that may be accessed by the device via the radio interface layer 772 or via a wired connection between the system 700 and a separate computing device associated with the system 700, for example, a server computer in a distributed computing network, such as the Internet. As should be appreciated, such data/information may be accessed via the radio interface layer 772 or via a distributed computing network. Similarly, such data/information may be readily transferred between computing devices for storage and use according to any of a variety of data/information transfer and storage means, including electronic mail and collaborative data/information sharing systems.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 824, a web portal 825, a mailbox service 826, an instant messaging store 828, or a social networking site 830.

A multi-stage machine learning framework 820 (e.g., similar to application 620) may be employed by a client that communicates with server device 802. Additionally, or alternatively, ML output generator 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these examples of the computing devices may obtain content from the store 816, in addition to receiving graphical data useable to be either pre-processed at a graphic-originating system, or post-processed at a receiving computing system.

It will be appreciated that the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, cause the system to perform a set of operations.

In an aspect, a system is provided, including at least one processor and memory storing instructions that, when executed by the at least one processor, cause the system to perform a set of operations. The set of operations include receiving a natural language (NL) query on operator metric data, where the operator metric data is associated with a plurality of metrics, and where each metric of the plurality of metrics is associated with a metric definition. The operations further include extracting context for the NL query based on a definition database including a plurality of metric definitions corresponding to the plurality of metrics and creating a first prompt based on the NL query and the extracted context. Additionally, the operations include receiving a first output from a first machine learning (ML) model based on the first prompt, where the first output includes one or more metrics relevant to determining an answer to the NL query, and creating a second prompt based on the NL query and the first output. The set of operations further includes receiving a second output from a second ML model based on the second prompt, where the second output includes a code query based on the one or more relevant metrics, and executing the code query on the one or more relevant metrics to generate the answer responsive to the NL query.

In further aspects of the system described above, where extracting the context further includes converting the plurality of metric definitions of the definition database and the NL query into word embeddings and performing a cosine similarity on the word embeddings to determine metric definitions having semantic similarity to the NL query, and where the extracted context includes metrics corresponding to the metric definitions. In additional aspects, where a size of the first prompt is limited based on the metrics. In further aspects, the set of operations includes generating a dashboard for visually representing the answer responsive to the NL query. In still further aspects, where the plurality of metrics is associated with a 5G multi-access edge computing system and the operator metric data is generated based on monitoring the plurality of metrics. Additionally, where the first ML model is different than the second ML model. Still further, where the first ML model and the second ML model are foundation ML models. Additional operations including generating a domain-specific database based on the definition database and extracting the context from the domain-specific database. In further aspects, where the answer responsive to the NL query is mathematically accurate.

In another aspect, a method of generating an answer to a natural language query is provided. The method including receiving a natural language (NL) query on operator metric data associated with a plurality of metrics, where each metric is associated with a metric definition. The method further including extracting metric context for the NL query based on a definition database comprising a plurality of metric definitions associated with the plurality of metrics, where the metric context comprises a set of metrics having metric definitions that are semantically similar to the NL query, and creating a first prompt to a first machine learning (ML) model based on the NL query and the extracted metric context. Additionally, the method includes receiving a first output from the first ML model based on the first prompt, where the first output includes one or more metrics relevant to determining an answer to the NL query, and creating a second prompt to a second ML model based on the NL query and the first output. Further, the method includes receiving a second output from the second ML model based on the second prompt, where the second output includes a code query based on the one or more relevant metrics, and executing the code query on the one or more relevant metrics to generate the answer responsive to the NL query.

In further aspects of the method described above, where extracting the metric context further includes converting the plurality of metric definitions of the definition database and the NL query into word embeddings and performing a cosine similarity on the word embeddings to determine the set of metrics having metric definitions that are semantically similar to the NL query. Additionally, aspects of the method where a size of the first prompt is limited based on the set of metrics. The method further includes generating a dashboard for visually representing the answer responsive to the NL query. In additional aspects, where the code query is one of a SQL query or a KQL query. In still further aspects, where the plurality of metrics is associated with a 5G multi-access edge computing system, and where the operator metric data is associated with monitoring the plurality of metrics. Additionally, where the first ML model and the second ML model are foundation ML models.

In yet another aspect, a method of generating an answer to a natural language query is provided. The method including receiving a natural language (NL) query on operator metric data associated with a plurality of metrics, where each metric is associated with a metric definition, and converting the plurality of metric definitions of the definition database and the NL query into word embeddings. Additionally, the method including performing a cosine similarity on the word embeddings to determine a set of metric definitions that are semantically similar to the NL query, where the set of metric definitions corresponds to a set of metrics, and creating a first prompt based on the NL query and the set of metrics. The method further including receiving a first output from a first ML model based on the first prompt, where the first output includes one or more metrics relevant to determining an answer to the NL query, and creating a second prompt based on the NL query and the one or more relevant metrics. Additionally, the method includes receiving a second output from a second ML model based on the second prompt, where the second output includes a code query based on the one or more relevant metrics, and executing the code query on the one or more relevant metrics to generate the answer responsive to the NL query.

In aspects of the method described above, the method further including generating a dashboard for visually representing the answer responsive to the NL query. In further aspects, where a size of the first prompt is limited based on the set of metrics. In still further aspects, where the plurality of metrics is associated with a 5G multi-access edge computing system, and where the operator metric data is associated with monitoring the plurality of metrics.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:
1. A system comprising:
   at least one processor; and
   memory storing instructions that, when executed by the at least one processor, cause the system to perform a set of operations, the set of operations comprising:
      receiving a natural language (NL) query for retrieving operator metric data, wherein the operator metric data indicate metrics of the system, the operator metric data represent one or more metrics of a plurality of metrics, and a metric of the plurality of metrics comprises a metric definition;
      extracting context of the NL query based on a definition database, wherein the definition database comprises the metric definition of a respective metric of the plurality of metrics, and the context comprises at least a part of the metric definition of the metric;
      creating a first prompt in natural language based on the NL query and the extracted context for interacting with a first machine learning (ML) model using the natural language;
      receiving a first output in the natural language from the first ML model, wherein the first output specifies one or more metrics for query for retrieving at least a part of the operator metric data as an answer to the NL query;
      creating a second prompt in the natural language based on the NL query and the first output for interacting with a second ML model using the natural language, wherein the second prompt comprises a request to the second ML model for generating code output;
      receiving a second output from the second ML model based on the second prompt, wherein the second output comprises a code query that causes retrieval of metric data of the one or more metrics;
      executing the code query, thereby retrieving and generating the metric data of the one or more metrics as the answer responsive to the NL query; and
      modifying data traffic based on the generated metric data.

2. The system of claim 1, wherein extracting the context further comprises:
  converting the metric definition of the definition database and the NL query into word embeddings; and
  performing a cosine similarity on the word embeddings to determine the metric definition having semantic similarity to the NL query, wherein the extracted context includes metrics corresponding to the metric definition.

3. The system of claim 2, wherein a size of the first prompt is limited based on the metrics.

4. The system of claim 1, further comprising:
  generating a dashboard for visually representing the answer responsive to the NL query.

5. The system of claim 1, wherein the respective metric of the plurality of metrics describes a type of performance data monitored and collected from at least a part of a 5G multi-access edge computing system to evaluate performance of the 5G multi-access edge computing system, and wherein the operator metric data is generated based on monitoring the plurality of metrics.

6. The system of claim 1, wherein the first ML model is different than the second ML model.

7. The system of claim 1, wherein the first ML model and the second ML model are foundation ML models.

8. The system of claim 1, further comprising:
  generating a domain-specific database based on the definition database; and
  extracting the context from the domain-specific database.

9. The system of claim 1, wherein the answer responsive to the NL query is mathematically accurate.

10. A method of generating an answer to a natural language query, comprising:
  receiving a natural language (NL) query for retrieving operator metric data, wherein the operator metric data indicate metrics of a system, the operator metric data represent one or more metrics of a plurality of metrics, and a metric of the one or more metrics comprises is associated with a metric definition;
  extracting context of the NL query based on a definition database, wherein the definition database comprises the metric definition of the respective metric, and the context comprises at least a part of the metric definition of the metric; and the context comprises a set of metrics having the metric definitions that is semantically similar to the NL query;
  creating a first prompt in natural language to a first machine learning (ML) model based on the NL query and the extracted context for interacting with the first machine learning (ML) model using the natural language;
  receiving a first output in the natural language from a first ML model, wherein the first output includes one or more metrics for query for retrieving at least a part of the operator metric data as an answer to the NL query;
  creating a second prompt in the natural language to a second ML model based on the NL query and the first output for interacting with a respond ML model using the natural language, wherein the second prompt comprises a request to the second ML model for generating code output;
  receiving a second output from the second ML model based on the second prompt, wherein the second output comprises a code query that causes retrieval of metric data the one or more metrics;
  executing the code query, thereby retrieving and generating the metric data of the one or more metrics as the answer responsive to the NL query; and
  modifying data traffic based on the generated metric data.

11. The method of claim 10, wherein extracting the context further comprises:
  converting the metric definition of the definition database and the NL query into word embeddings; and
  performing a cosine similarity on the word embeddings to determine the set of metrics having a metric definitions that is semantically similar to the NL query.

12. The method of claim 11, wherein a size of the first prompt is limited based on the set of metrics.

13. The method of claim 10, further comprising:
  generating a dashboard for visually representing the answer responsive to the NL query.

14. The method of claim 10, wherein the code query is one of a SQL query or a KQL query.

15. The method of claim 10, wherein the respective metric of the plurality of metrics describes a type of performance data monitored and collected from at least a part of a 5G multi-access edge computing system to evaluate performance of the 5G multi-access edge computing system, and wherein the operator metric data is associated with monitoring the plurality of metrics.

16. The method of claim 10, wherein the first ML model and the second ML model are foundation ML models.

17. A method of generating an answer to a natural language query, comprising:
  receiving a natural language (NL) query for retrieving operator metric data, wherein the operator metric data indicate metrics of a system, the operator metric data represent one or more metrics of a plurality of metrics, and a metric of the plurality of metrics comprises a metric definition;
  converting the plurality of metric definitions of a definition database and the NL query into word embeddings;
  performing a cosine similarity on the word embeddings to determine a set of metric definitions that are semantically similar to the NL query, wherein the set of metric definitions corresponds to a set of metrics;
  creating a first prompt in natural language based on the NL query and the extracted context for interacting with a first machine learning (ML) model using the natural language;
  receiving a first output in the natural language from the first ML model, wherein the first output specifies one or more metrics for query for retrieving at least a part of the operator metric data as an answer to the NL query;
  creating a second prompt in the natural language based on the NL query and the first output for interacting with a second ML model using the natural language, wherein the second prompt comprises a request to the second ML model for generating code output;
  receiving a second output from the second ML model based on the second prompt, wherein the second output comprises a code query that causes retrieval of metric data of the one or more metrics;
  executing the code query, thereby retrieving and generating the metric data of the one or more metrics as the answer responsive to the NL query; and
  modifying data traffic based on the generated metric data.

18. The method of claim 17, further comprising:
  generating a dashboard for visually representing the answer responsive to the NL query.

19. The method of claim 17, wherein a size of the first prompt is limited based on the set of metrics.

20. The method of claim 17, wherein the respective metric of the plurality of metrics describes a type of performance data monitored and collected from at least a part of a 5G multi-access edge computing system to evaluate performance of the 5G multi-access edge computing system, and wherein the operator metric data is associated with monitoring the plurality of metrics.

* * * * *